(12) United States Patent
Hutchins et al.

(10) Patent No.: US 7,589,927 B2
(45) Date of Patent: Sep. 15, 2009

(54) DYNAMICALLY ADAPTING A READ CHANNEL EQUALIZER

(75) Inventors: Robert Allen Hutchins, Tucson, AZ (US); Sedat Oelcer, Kilchberg (CH); Jens Jelitto, Rueschlikon (CH); Evangelos S. Eleftheriou, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 11/215,409

(22) Filed: Aug. 30, 2005

(65) Prior Publication Data

US 2007/0047127 A1   Mar. 1, 2007

(51) Int. Cl.
    *G11B 5/35* (2006.01)
(52) U.S. Cl. ............... 360/65; 360/46; 360/55; 360/77.12
(58) Field of Classification Search ............... None
    See application file for complete search history.

(56) References Cited

U.S. PATENT DOCUMENTS

| | | | |
|---|---|---|---|
| 5,068,753 A | | 11/1991 | Kanegae |
| 5,173,925 A | * | 12/1992 | Mizoguchi ............... 375/232 |
| 5,355,261 A | * | 10/1994 | Taratorin ............... 360/53 |
| 5,436,771 A | | 7/1995 | Yun |
| 5,490,091 A | * | 2/1996 | Kogan et al. ............... 702/180 |
| 5,619,539 A | | 4/1997 | Coker et al. |
| 5,644,595 A | | 7/1997 | Yamasaki et al. |
| 5,764,695 A | * | 6/1998 | Nagaraj et al. ............... 375/232 |
| 5,790,335 A | * | 8/1998 | Sugawara et al. ............... 360/68 |
| 5,844,741 A | * | 12/1998 | Yamakawa et al. ............... 360/65 |
| 5,880,645 A | | 3/1999 | Everitt et al. |
| 6,144,513 A | * | 11/2000 | Reed et al. ............... 360/51 |
| 6,144,519 A | * | 11/2000 | Hanaoka et al. ............... 360/92 |
| 6,151,179 A | * | 11/2000 | Poss ............... 360/46 |
| 6,151,365 A | * | 11/2000 | Higashino et al. ............... 375/263 |
| 6,158,027 A | * | 12/2000 | Bush et al. ............... 714/709 |
| 6,185,716 B1 | * | 2/2001 | Riggle ............... 714/769 |
| 6,282,042 B1 | * | 8/2001 | Hana et al. ............... 360/64 |

(Continued)

FOREIGN PATENT DOCUMENTS

JP   2003338133 A   11/2003

OTHER PUBLICATIONS

U.S. Patent Application entitled "Dynamically Adapting a Magnetic Tape Read Channel Equalizer", IBM, U.S. Appl. No. 11/003,283, filed Dec. 3, 2004, by inventors R.A. Hutchins, G.A. Jaquette, E.S. Eleftheriou and S.O. Kilchberg.

*Primary Examiner*—William J Kilmowicz
*Assistant Examiner*—Dismery E Mercedes
(74) *Attorney, Agent, or Firm*—David W. Victor; Konrad Raynes & Victor LLP (57) ABSTRACT

Provided is a read channel incorporated in a storage device to process signals read from a storage medium. The read channel includes an equalizer equalizing input read signals to produce equalizer output signals. A detector senses an adjusted equalizer output signal to determine an output value comprising data represented by the input read signals. An equalizer adaptor receives the output value from the detector to determine a first error signal used to adjust the equalizer operations. A component adjusts the equalizer output signals being transmitted to the detector, wherein the component is adjusted by a second error signal calculated from the output value from the detector, wherein the first and second error signals are different.

9 Claims, 4 Drawing Sheets

U.S. PATENT DOCUMENTS

| | | |
|---|---|---|
| 6,381,085 B1 | 4/2002 | Du et al. |
| 6,385,239 B1 * | 5/2002 | Okamoto et al. ............ 375/232 |
| 6,449,110 B1 * | 9/2002 | DeGroat et al. ............... 360/46 |
| 6,523,052 B1 | 2/2003 | Staszewski |
| 6,532,122 B1 * | 3/2003 | Sugawara et al. ............. 360/46 |
| 6,560,053 B1 * | 5/2003 | Ohta et al. .................... 360/51 |
| 6,580,768 B1 * | 6/2003 | Jaquette ...................... 375/341 |
| 6,735,724 B1 * | 5/2004 | McClellan .................. 714/704 |
| 6,791,776 B2 * | 9/2004 | Kato et al. .................... 360/39 |
| 6,801,380 B1 * | 10/2004 | Sutardja ....................... 360/65 |
| 6,819,514 B1 * | 11/2004 | Behrens et al. ............... 360/65 |
| 6,980,385 B2 * | 12/2005 | Kato et al. .................... 360/39 |
| 7,012,772 B1 * | 3/2006 | Vis ............................... 360/46 |
| 2002/0075861 A1 * | 6/2002 | Behrens et al. ............. 370/359 |
| 2004/0030948 A1 * | 2/2004 | Yamazaki et al. ............... 714/2 |
| 2004/0071206 A1 * | 4/2004 | Takatsu ...................... 375/232 |
| 2005/0213241 A1 * | 9/2005 | Cideciyan et al. ............ 360/65 |
| 2006/0133252 A1 * | 6/2006 | Rapp ....................... 369/59.22 |

* cited by examiner

DYNAMICALLY ADAPTING A READ CHANNEL EQUALIZER

BACKGROUND OF THE INVENTION

1. Field of the Invention

The present invention relates to a system and device for dynamically adapting a read channel equalizer.

2. Description of the Related Art

Magnetic tape cartridges include magnetic tape to store data to be saved and read back at a subsequent time. A magnetic tape drive writes the data to magnetic tape, typically as a set of parallel tracks, and subsequently a magnetic tape drive reads back the data. To read back the data, a magnetic tape drive typically comprises parallel read heads to read each of the parallel tracks, a drive system for moving a magnetic tape with respect to the read heads such that the read heads may detect magnetic signals on the magnetic tape, and a read channel for digitally sampling magnetic signals detected by the read heads and providing digital samples of the magnetic signals. The digital samples are then decoded into data bits, and the data bits from the parallel tracks are combined into the data that was saved. The read channel typically requires an equalizer for each of the read heads to compensate for the change in the signal due to the magnetic recording properties of the write head, the magnetic tape, and the read head. Magnetic tapes may be interchanged between tape drives, such that a magnetic tape written on one tape drive will be read by another tape drive. Variation in the response of the read heads to the variously written magnetic tapes may result in unacceptably poor read back of the recorded signals.

Adaptive equalizers implemented in magnetic tape drives solve a set of equations to find the equalizer characteristic that reduces the error between the desired and actual amplitudes. The set of equations may be highly complex and computationally expensive. Thus, the equalizer might be computed at the beginning of use with respect to a magnetic tape, or recomputed a few times during use. Further, the desired amplitudes may be difficult to estimate. Hence, in many instances, the desired amplitudes are best estimated by employing a signal having known characteristics, such as a synchronization signal, or a data set separator signal, and not the random data signals.

In magnetic tape, the recording characteristics may not only vary from track to track, but may as well vary in a continuous fashion along a track or tracks. Thus, a selected equalizer characteristic, although satisfactory at the beginning or at some specific track location of a magnetic tape, may lead to an increase in data read errors at some point along the track.

Further, in magnetic tape, an equalizer typically equalizes signals in the asynchronous domain, which means that the digital samples that are processed by the equalizer are taken asynchronously with respect to the clock that is used to write the data on the magnetic tape. This makes a determination of a desired amplitude at the point of the asynchronous sample a difficult task.

The co-pending and commonly assigned patent application entitled "Dynamically Adapting a Magnetic Tape Read Channel Equalizer", by Evangelos S. Eleftheriou, Robert A. Hutchins, Glen Jaquette, and Sedat Oelcer, having application Ser. No. 11/003,283 and filed on Jan. 12, 2005, provides a technique for dynamically adapting the equalizer to improve stability and the signal-to-noise ratio. In this application, the equalizer has at least one adjustable tap and equalizes input read signals. A detector senses the equalizer output signals after the gain has been adjusted by a gain control loop. The received signal and the desired signal are typically different and the difference is used to produce an error signal that is provided as feedback to a gain control loop that adjusts the variable gain amplifier circuit that controls the amplitude of the equalizer output signal. The same error signal is further provided to an equalizer adaptor to feed back sensed amplitude independent errors to adjustable taps of the equalizer. Further, if the gain control loop and the equalizer adaptation loop use error signals from the same source, the two loops interact. The result of this interaction is that more taps in the equalizer must be fixed for stable equalizer loop adaptation. However, fixing more taps reduces the ability of the equalizer to adapt.

SUMMARY

Provided is a read channel incorporated in a storage device to process signals read from a storage medium. The read channel includes an equalizer equalizing input read signals to produce equalizer output signals. A detector senses an adjusted equalizer output signal to determine an output value comprising data represented by the input read signals. An equalizer adaptor receives the output value from the detector to determine a first error signal used to adjust the equalizer operations. A component adjusts the equalizer output signals being transmitted to the detector, wherein the component is adjusted by a second error signal calculated from the output value from the detector, wherein the first and second error signals are different.

Further provided is a read channel incorporated in a storage device to process signals read from a storage medium. The read channel includes an equalizer equalizing input read signals to produce equalizer output signals. A first slicer receives a first adjusted equalizer output signal to produce a first output value comprising data represented by the input read signals. An equalizer adaptor receives the first output value and the first adjusted equalizer output signal to determine a first error signal used to adjust the equalizer operations. A second slicer receives a second adjusted equalizer output signal to produce a second output value comprising data represented by the input read signals that is different from the first output value. A component processes the first adjusted equalizer output signal to produce the second adjusted equalizer output signal, wherein the first adjusted equalizer output signal and the second output value are used to produce a second error signal used to adjust the component.

DETAILED DESCRIPTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
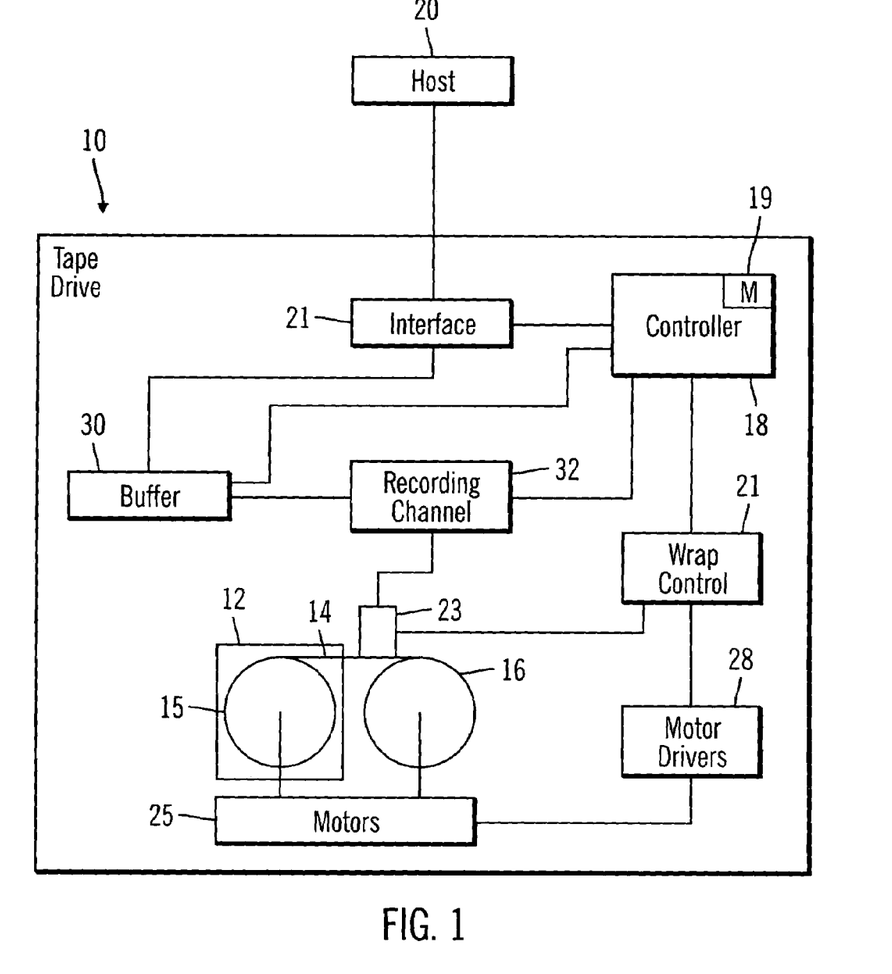
FIG. 1 illustrates an embodiment of a tape drive.

FIG. 1 illustrates an embodiment of a magnetic tape drive 10. The magnetic tape drive provides a means for reading and writing information with respect to a magnetic tape 14 of a magnetic tape cartridge 11. Magnetic tape cartridges include a magnet tape storage medium to store data to be saved and read at a subsequent time. Further, the magnetic tape cartridges may be interchanged between tape drives, such that a magnetic tape written on one tape drive will be read by another tape drive. The magnetic tape cartridge 11 comprises a length of magnetic tape 14 wound on one or two reels 15, 16.

A single reel magnetic tape cartridge 11 is illustrated, examples of which are those adhering to the Linear Tape Open (LTO) format. An example of a magnetic tape drive 10 is the IBM 3580 Ultrium magnetic tape drive based on LTO technology. A further example of a single reel magnetic tape drive and associated cartridge is the IBM 3592 TotalStorage Enterprise magnetic tape drive and associated magnetic tape cartridge. An example of a dual reel cartridge is the IBM 3570 magnetic tape cartridge and associated drive. In alternative embodiments, additional tape formats that may be used include Digital Linear Tape (DLT), Digital Audio Tape (DAT), etc.

The magnetic tape drive 10 comprises one or more controllers 18 of a recording system for operating the magnetic tape drive in accordance with commands received from a host system 20 received at an interface 21. A controller typically comprises logic and/or one or more microprocessors with a memory 19 for storing information and program information for operating the microprocessor(s). The program information may be supplied to the memory via the interface 21, by an input to the controller 18 such as a floppy or optical disk, or by read from a magnetic tape cartridge, or by any other suitable means. The magnetic tape drive 10 may comprise a standalone unit or comprise a part of a tape library or other subsystem. The magnetic tape drive 10 may be coupled to the host system 20 directly, through a library, or over a network, and employ at interface 21 a Small Computer Systems Interface (SCSI), an optical fiber channel interface, etc. The magnetic tape cartridge 11 may be inserted in the magnetic tape drive 10, and loaded by the magnetic tape drive so that one or more read and/or write heads 23 of the recording system reads and/or writes information in the form of signals with respect to the magnetic tape 14 as the tape is moved longitudinally by two motors 25 which rotate the reels 15, 16. The magnetic tape typically comprises a plurality of parallel tracks, or groups of tracks. In certain tape formats, such as the LTO format, the tracks are arranged in a serpentine back and forth pattern of separate wraps, as is known to those of skill in the art. Also, the recording system may comprise a wrap control system 27 to electronically switch to another set of read and/or write heads, and/or to seek and move the read and/or write heads 23 laterally of the magnetic tape, to position the heads at a desired wrap or wraps, and, in some embodiments, to track follow the desired wrap or wraps. The wrap control system may also control the operation of the motors 25 through motor drivers 28, both in response to instructions by the controller 18.

Controller 18 also provides the data flow and formatter for data to be read from and written to the magnetic tape, employing a buffer 30 and a recording channel 32, as is known to those of skill in the art.

The tape drive 10 system further includes motors 25 and reels 15, 16 to move the magnetic tape 14 with respect to the read head(s) 23 such that the read head(s) may detect magnetic signals on the magnetic tape. A read channel of the recording channel 32 digitally samples the magnetic signals detected by the read head(s) to provide digital samples of the magnetic signals for further processing.

Figure 2:
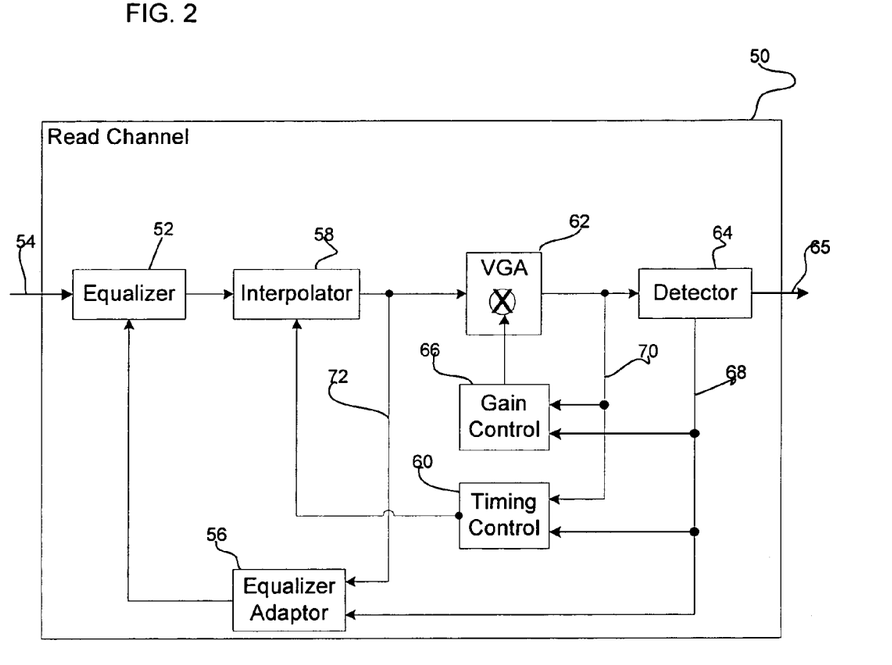
FIGS. 2, 3, and 4 illustrate embodiments of a read channel in the tape drive.
Figure 3:
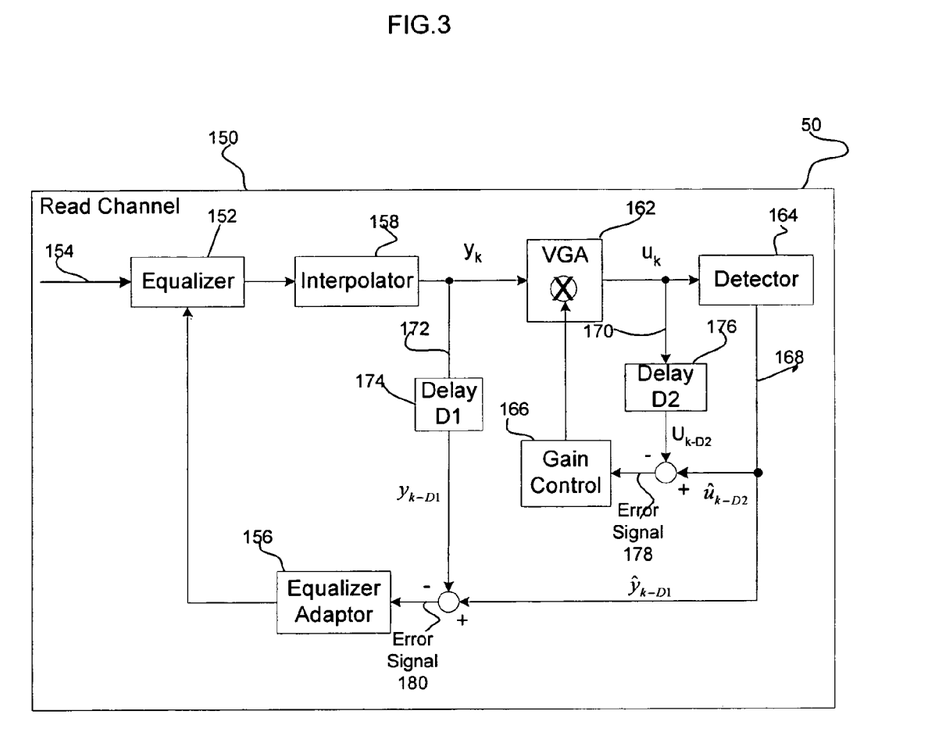
Figure 4:
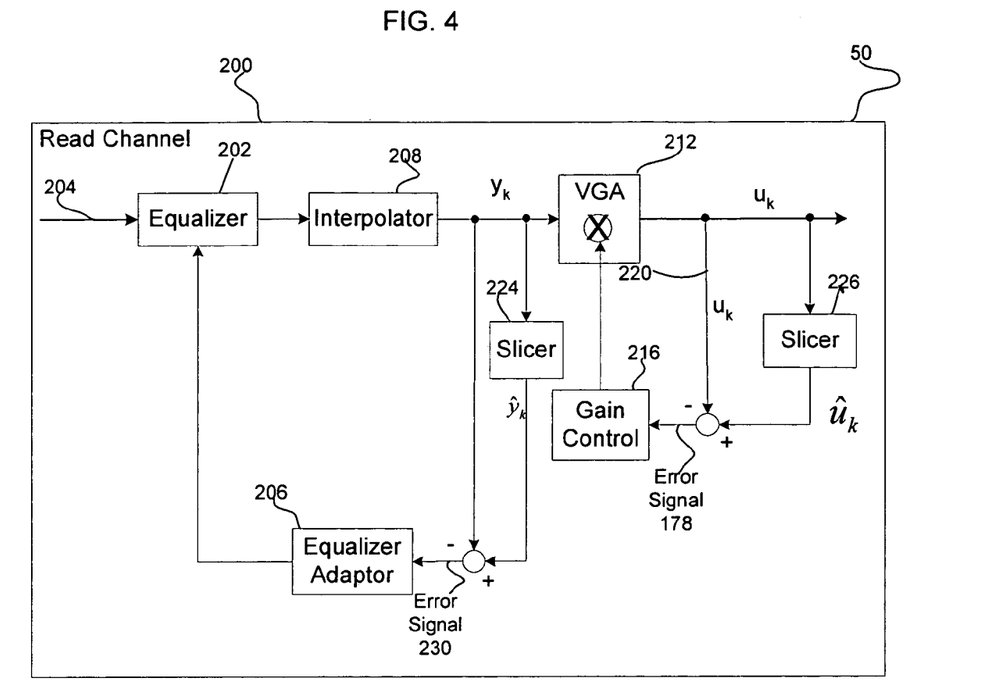

FIGS. 2, 3, and 4 illustrate embodiments of a portion of a read channel of the recording channel 32 of FIG. 1 including an embodiment of a dynamically adaptive equalizer. In embodiments where the read channel may concurrently read a plurality of parallel tracks, the recording channel 32 may comprise a plurality of read channels, in which some of the components may be shared.

FIG. 2 illustrates an embodiment of certain, but not all, of the components of a read channel 50 to provide digital samples of the magnetic signals detected by the read head 23. An equalizer 52 receives a signal 54 from an analog-to-digital converter (ADC) (not shown), which converts analog signals read from tape to digital samples that can be processed by the equalizer 52. In one embodiment, the equalizer 52 may comprise a finite impulse response (FIR) filter having adjustable taps. The equalizer 52 modifies the digital samples to compensate for differences in the signal due to the magnetic recording properties of the write head, the magnetic tape, and the read head. The modification is based on a series of specific functions, whose coefficients may be adapted by an equalizer adaptor 56. The modified digital samples output by the equalizer 52 are supplied to an interpolator 58 comprising a timing circuit to space the signals into single samples that are spaced by a bit or symbol intervals.

Determination of the information content of the magnetic signals requires determining the timing or position of magnetic transitions of the magnetic signals. Typically, the sample signals 54 are taken asynchronously with respect to the clock used to write the data on the magnetic tape. The interpolator 58 interpolates the asynchronous samples into a set of samples that can be considered to be synchronous with the write clock or with the positions of the magnetic recording transitions. A timing control component 60 may include phase-error generation logic, a phase locked loop (PLL) and phase interpolation logic to derive a reference for the interpolator 58 to provide the synchronous samples. A variable gain amplifier circuit (VGA) 62, which may comprise a custom designed logic circuit, adjusts the gate on the signals from the interpolator 58 to scale the synchronous samples to optimal levels.

A detector 64 receives the gain adjusted synchronous digital samples from the VGA 62 to determine the data information represented by the digital samples, i.e., a zero or one. The determined data information is outputted as signal 65 for further processing. In one embodiment, besides determining the data information, the detector 64 may compare the synchronized, gain adjusted equalizer output to desired values and determine the desired value that is closest, and then select that closet desired value as the detector 64 output shown as output value 68. The determined output value 68 from the detector 64, i.e., the desired value, and the signal 70 inputted to the detector 64 is provided to a gain control 66 that calculates an error signal to adjust the VGA circuit 62 and is used by the timing control 60 to adjust the interpolator 58. Further, the determined output value 68 from the detector 64 and the input 72 to the VGA circuit 62 are provided to the equalizer adaptor 56 to determine an error signal to adjust the coefficients used by the equalizer 52. In this way, the equalizer 52 is decoupled from the VGA circuit 62 because the signal used to generate the equalizer error 72 is outside of the gain adjustment loop. Thus, the loop formed from the equalizer 52 to the equalizer adaptor 56 is decoupled from the loop from the VGA circuit 62 through the gain control 66. The use of different error signals to adjust the equalizer 52 versus the interpolator 58 and VGA circuit 62 has been found to avoid convergence problems, improve stability, and improve the signal-to-noise ratio.

The error signals calculated by the equalizer adaptor 56 and components 58 and 62 may comprise amplitude independent error signals. The equalizer adaptor 56 may use the error signal to adjust one or more coefficients (taps) of the equalizer. The amplitude independent error signals may be considered as signals of the fact of each offset and not reflect the amount of the offset. Further, the polarity of each signaled offset may be part of the amplitude independent error signals, thus indicating the polarity of the offset or error. Thus, the amplitude independent error signals indicate not only that there was an error, but also the direction of the error. The simplified error signals allow the adaptation of the equalizer to be dynamic, and allow data signals to be employed to provide the dynamic adaptation.

In one embodiment, the equalizer 52 may adjust the input signal 54 by using a finite impulse response (FIR) filter producing output ($Z_n$) based on coefficients (c) supplied by the equalizer adaptor 56, adjusted by the error signal comprising the difference of the output of the detector 68 (desired value) and the input 72 to the VGA circuit 62. Equation (1) below shows a how the input 54 ($x_n$) is adjusted by the coefficients (c). The coefficients (c) comprise an index of n coefficients at a time constant (i).

$$Z_n = \sum_{i=0}^{N-1} c_{i,n} x_{n-i} \quad (1)$$

The equalizer adaptor 56 adjusts coefficients (c) according to the error signal ($e_n$) calculated from the detector output 64 and the input 72 to the VGA circuit 62. A programmable parameter ($\alpha$) controls the speed at which the coefficients converge, i.e., the larger alpha ($\alpha$) the faster the convergence. In one embodiment, the equalizer adaptor 56 calculates adjusted coefficients (c) by using a least-means-squares (LMS) algorithm shown below in equation (2). The adjusted coefficients are then used by the equalizer 52 in equation (1) to calculate the adjusted signal.

$$c_{i,n+1} = c_{i,n} - \alpha e_n x_{n-1}, \text{ where } i=0, 1 \ldots N-1 \quad (2)$$

In this way, the error signal used to adjust the equalizer 52 differs from the error signal used to adjust the VGA circuit 62 and the interpolator 58, providing loop decoupling. With loop decoupling, the stability problems due to the coupling of adaptive equalizer and gain adjustments are avoided. Because the equalizer is in the "asynchronous time domain" (i.e., before the interpolator) and because some small amount of interaction exists between the equalizer and the timing control loops, the equalizer adjustment algorithm (LMS algorithm) may need to be constrained in order to avoid possible ill-convergence problems. This can be achieved by fixing (i.e., not adjusting) some of the equalizer coefficients (c). Equation (3) below shows how the coefficient (c) may be calculated, such that certain coefficients are fixed to their current value if they are at an index (i) that is a member of the set of fixed coefficients (I).

$$c_{i,n+1} = \begin{cases} c_{i,n} - \alpha e_n x_{n-i}, & i \in I \\ c_{i,n}, & i \notin I \end{cases} \quad (3)$$

Thus, if the coefficient is a member of the set of fixed coefficients (I), the coefficient for the time cycle (n+1), $c_{i,n+1}$, is set to the coefficient $c_{i,n}$, at the previous time cycle (n), i.e., the coefficient-tap is fixed. If the coefficient ($c_i$) is not a member of the set of fixed coefficients, then it is adjusted. The designer of the read channel 50 may determine the number of coefficients to fix based on empirical testing.

FIG. 3 illustrates an embodiment of a read channel 150 including many of the same components of read channel 50, and introducing delay circuits 174 and 176, without showing the timing circuit. By introducing the delays, the error signal 178 to the gain control 166 used to adjust the VGA 162 comprises the ideal signal ($\hat{u}_k-_{D2}$) as delayed through the detector by D2 delays subtracted by the actual signal or input to the detector ($u_k-_{D2}$), which is delayed by D2 delays to match the delay through the detector 164. The error signal 180 to the equalizer adaptor 156 comprises the ideal signal ($\hat{y}_k-_{D1}$) subtracted by the actual signal ($y_k-_{D1}$) or input to the VGA 162, which is delayed by D1 delays to match the delay through the detector 164. This method uses the power of the detector 164 to estimate the ideal signals at the cost of having additional delay within the two feedback loops.

FIG. 4 illustrates an additional embodiment of a read channel 200 including many of the same components of read channel 50, and introducing slicers 224 and 226. The slicer 226 implements the operations of the detector without the need for the delay circuits of FIG. 3 and likewise the slicer 224 implements the operations of the detector without the need for the delay (D1) shown in FIG. 3. In this way, each slicer 224, 226 provides the output value comprising an ideal signal represented by the input read signal. The ideal sample estimate provided through the use of slicers may not be as accurate as using the sample estimates from the detector but there is no delay associated with making the estimate.

Those of skill in the art will understand that changes may be made with respect to the components illustrated herein. Further, those of skill in the art will understand that differing specific component arrangements may be employed than those illustrated herein. For example, the detector 64 of FIG. 2 may comprise a detector that derives desired values from data detector; compares the equalizer output signals to the desired values; and, if there is an offset, signals the fact of an error as an amplitude independent error signal.

The described components of the read channel may comprise discrete logic, ASIC (application specific integrated circuit), FPGA (field programmable gate array), custom processors, etc. The described components of the read channel may also comprise subroutines in programs or other software implementations.

Components shown in FIGS. 2, 3, and 4 as separate components may be implemented in a single circuit device or functions of one illustrated component may be implemented in separate circuit devices.

What is claimed is:

1. A read channel incorporated in a storage device to process signals read from a storage medium, comprising:

an equalizer equalizing input read signals to produce equalizer output signals;

a detector sensing an adjusted equalizer output signal to determine an output value comprising data represented by the input read signals;

an equalizer adaptor receiving the output value from the detector and a first input signal representing the equalizer output signal before being sensed by the detector to determine a first error signal used to adjust the equalizer operations;

a first component adjusting the equalizer output signals to produce adjusted equalizer output signals transmitted to the detector, wherein the first component is adjusted by a second error signal;

a second component calculating the second error signal from the output value from the detector and a second input signal representing one of the adjusted equalizer output signals before being sensed by the detector, wherein the first and second input signals are different and are adjusted by different components in a signal path between the equalizer and the detector, wherein the first and second error signals are different.

2. The read channel of claim 1, wherein the first component comprises a gain amplifier.

3. The read channel of claim 1, further comprising:

a first delay circuit to adjust the first input signal by a first delay, wherein the first error signal is calculated by the equalizer adaptor using the output value from the detector and the first input signal adjusted by the first delay; and a second delay circuit to adjust the second input signal by a second delay, wherein the second error signal is calculated by the second component using the output value from the detector and the second input signal adjusted by the second delay.

4. The read channel of claim 1, wherein the equalizer uses a finite impulse response (FIR) filter to produce the equalizer output signals and wherein the equalizer adaptor adjusts the equalizer operations by adjusting a first set of coefficients and fixing a second set of coefficients used by the FIR filter to produce the equalizer output signals.

5. A storage drive for performing Input/Output (I/O) operations with respect to a storage medium coupled to the storage drive, comprising:

a head to read data from the storage medium; and a read channel in data communication with the head to process signals the head reads from the storage medium, comprising:

an equalizer equalizing input read signals to produce equalizer output signals;

a detector sensing an adjusted equalizer output signal to determine an output value comprising data represented by the input read signals;

an equalizer adaptor receiving the output value from the detector and a first input signal representing the equalizer output signal before being sensed by the detector to determine a first error signal used to adjust the equalizer operations;

a first component adjusting the equalizer output signals to produce adjusted equalizer output signals transmitted to the detector, wherein the first component is adjusted by a second error signal; and a second component calculating the second error signal from the output value from the detector and a second input signal representing one of the adjusted equalizer output signals before being sensed by the detector, wherein the first and second input signals are different and are adjusted by different components in a signal path between the equalizer and the detector, wherein the first and second error signals are different.

6. The storage drive of claim 5, wherein the first component comprises a gain amplifier.

7. The storage drive of claim 5, wherein the read channel further comprises:

a first delay circuit to adjust the first input signal by a first delay, wherein the first error signal is calculated by the equalizer adaptor using the output value from the detector and the first input signal adjusted by the first delay; and a second delay circuit to adjust the second input signal by a second delay, wherein the second error signal is calculated by the second component using the output value from the detector and the second input signal adjusted by the second delay.

8. The storage drive of claim 5, wherein the equalizer uses a finite impulse response (FIR) filter to produce the equalizer output signals and wherein the equalizer adaptor adjusts the equalizer operations by adjusting a first set of coefficients and fixing a second set of coefficients used by the FIR filter to produce the equalizer output signals.

9. The storage drive of claim 5, wherein the storage drive comprises a tape drive and wherein the storage medium comprises magnetic tape.

* * * * *

UNITED STATES PATENT AND TRADEMARK OFFICE
CERTIFICATE OF CORRECTION

PATENT NO. : 7,589,927 B2  Page 1 of 1
APPLICATION NO. : 11/215409
DATED : September 15, 2009
INVENTOR(S) : Hutchins et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 270 days.

Signed and Sealed this

Twenty-first Day of September, 2010

David J. Kappos
*Director of the United States Patent and Trademark Office*